US006876800B2

(12) United States Patent
Sutehall et al.

(10) Patent No.: US 6,876,800 B2
(45) Date of Patent: Apr. 5, 2005

(54) OPTICAL FIBER CABLE

(75) Inventors: Ralph Sutehall, Gwent (GB); Jason Pedder, Bavaria (DE); Ian Dewi Lang, Newport (GB); Matthew John Todd, Cardiff (GB)

(73) Assignee: Pirelli General plc, London (GB)

( * ) Notice: Subject to any disclaimer, the term of this patent is extended or adjusted under 35 U.S.C. 154(b) by 0 days.

(21) Appl. No.: 10/343,907

(22) PCT Filed: Jul. 25, 2001

(86) PCT No.: PCT/GB01/03343

§ 371 (c)(1),
(2), (4) Date: Aug. 5, 2003

(87) PCT Pub. No.: WO02/12943

PCT Pub. Date: Feb. 14, 2002

(65) Prior Publication Data

US 2004/0037522 A1 Feb. 26, 2004

(30) Foreign Application Priority Data

Aug. 7, 2000 (EP) ............................. 00306704

(51) Int. Cl.[7] ................................. G02B 6/44
(52) U.S. Cl. ....................................... 385/113
(58) Field of Search ................................. 385/110–113

(56) References Cited

U.S. PATENT DOCUMENTS

| 4,550,976 A | 11/1985 | Cooper et al. ........... 350/96.23 |
| 5,046,815 A | 9/1991 | Cain et al. |
| 5,369,720 A * | 11/1994 | Parry et al. ................. 385/114 |
| 6,101,304 A | 8/2000 | Quistorff et al. |
| 6,195,487 B1 | 2/2001 | Anderson et al. |
| 2004/0033036 A1 * | 2/2004 | Park et al. ................... 385/113 |

FOREIGN PATENT DOCUMENTS

| EP | 0 454 405 A2 | 10/1991 |
| EP | 0 456 909 A2 | 11/1991 |
| EP | 0 562 770 A2 | 9/1993 |
| EP | 0 957 494 A2 | 11/1999 |
| EP | 0 969 302 A1 | 1/2000 |
| EP | 1 004 914 A1 | 5/2000 |
| WO | WO 02/12943 A1 | 2/2002 |

OTHER PUBLICATIONS

D. Lawrence et al., "Large Scale Manufacturing and Testimony of Singlemode Cables," ICC 84, vol. 3, pp. 1051–1055 (May 14–17, 1984).

Standard Search Report from European Patent Office dated Aug. 16, 2002.

* cited by examiner

Primary Examiner—Khiem Nguyen
(74) Attorney, Agent, or Firm—Finnegan, Henderson, Farabow, Garrett & Dunner, L.L.P.

(57) ABSTRACT

An optical fiber cable for blown installation has a tubular central strength member about which tubes loosely housing optical fibers are stranded. The jacket is preferably formed from a high density polyethylene material and is extruded over the core on which rip cords are positioned. A water blocking compound is provided in each tube in any spaces therein which would otherwise be void. Also a water blocking material is provided between the sheath and the layer defined by the helically wound wrapping tape or binding yarn in any spaces between the tubes which would otherwise be void.

7 Claims, 5 Drawing Sheets

PRIOR ART

OPTICAL FIBER CABLE

CROSS REFERENCE TO RELATED APPLICATIONS

This application is a national phase application based on PCT/GB01/03343, filed Jul. 25, 2001, the content of which is incorporated herein by reference, and claims the priority of European Patent Application No. 00306704.8, filed Aug. 7, 2000, the content of which is incorporated herein by reference.

BACKGROUND OF THE INVENTION

1. Field of the Invention

This invention relates to optical fibre cable and more particularly although not exclusively to such cable for blown installation.

2. Description of the Related Art

One method of installing an optical fibre cable in a duct comprises blowing the cable into the duct using gaseous flow which is fed into an inlet end of the duct together with the cable. The length of cable which can be blown into the duct can be increased by applying an additional pushing force to the cable at the inlet end of the duct. Optical fibre cables for blown installation do not have to withstand high tensile loads (unlike cables which are to be pulled through ducting) but they do require a degree of stiffness for the application of the pushing force.

A design of optical fibre cable marketed by Pirelli Cables Ltd under the designation 'Multi-Element Loose Tube' (MLT) is shown in FIG. 1 and has a core 10 comprising a plurality of tubes 12 stranded about a central solid strength member 14 and a plurality of optical fibres 16 in each tube 12, and a jacket 18 surrounding said core 10. An aluminium/plastics laminate tape 20 surrounds the tubes to retain the same about the strength member 14 and also to act as a moisture barrier and, because it is electrically conductive, to enable location of the cable to be detected. Also spaces within each tube which would otherwise be void are filled with a water blocking material 22.

SUMMARY OF THE INVENTION

One object of the invention is to provide an optical fibre cable for blown installation with improved installation performance.

To this end the present invention provides an optical fibre cable having a core comprising at least one tube stranded about a central strength member and at least one optical fibre loosely housed in said at least one tube, and a jacket surrounding said core, wherein said central strength member is tubular, said central strength member having a peripheral wall enclosing a passage extending along the length of said central strength member.

The at least one tube stranded about the central strength member need not contact the central strength member. Thus a sheath may be disposed between said central strength member and said at least one tube.

The central strength member may be formed in a fibre reinforced plastics material, for example a glass fibre reinforced plastics material.

At least one elongate element enabling cable location detection may be accommodated within and extend along the length of said passage of the central strength member.

Alternatively or additionally at least one tube member loosely housing at least one optical fibre may be accommodated within and extend along the length of said passage of the central strength member.

Alternatively or additionally at least one empty tube member for blown optical fibre installation may be accommodated and extend along the length of said passage of the central strength member.

BRIEF DESCRIPTION OF THE DRAWINGS

In order that the invention may be well understood some embodiments thereof which are given by way of example only will now be described with reference to the accompanying drawings in which.

DETAILED DESCRIPTION OF THE INVENTION

Figure 1:
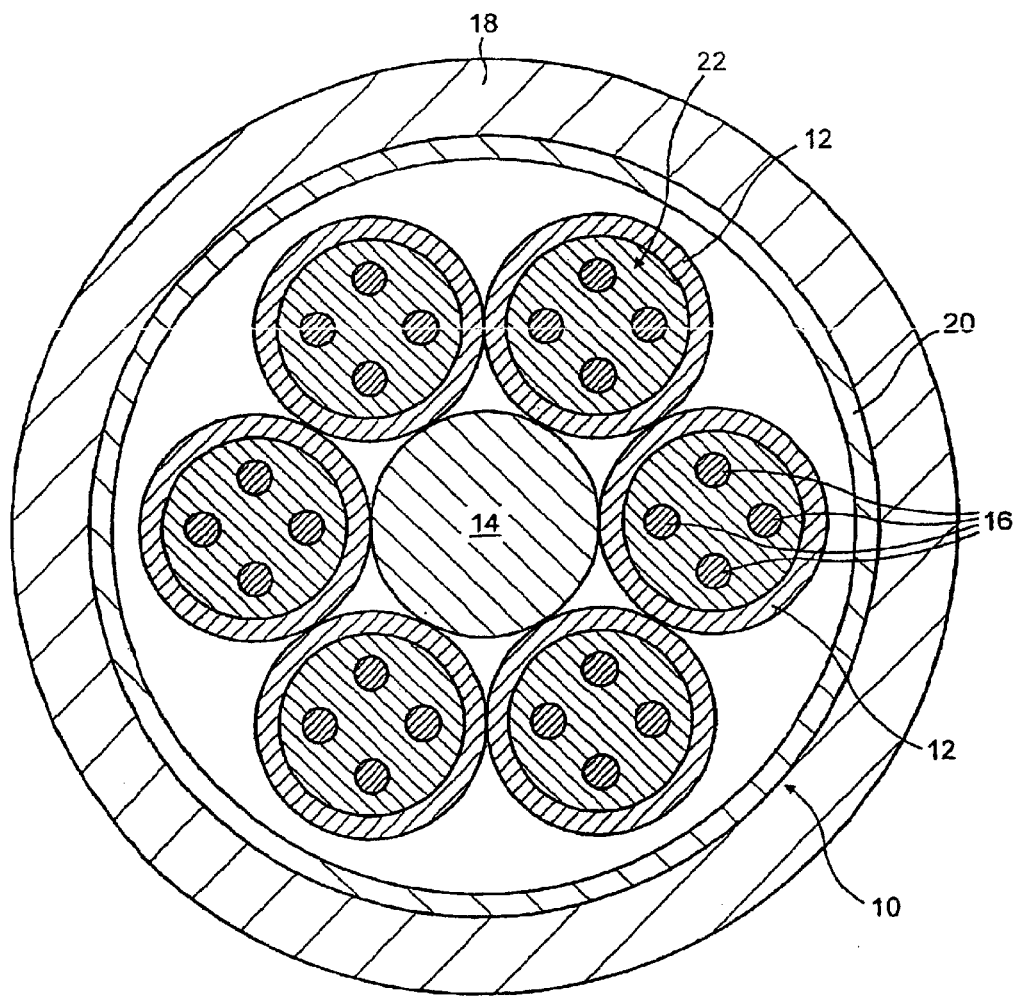
FIG. 1 is a radial cross-section of a known optical fibre suitable for blown installation.

The cables illustrated in FIGS. 2 to 5 each have a core 100 comprising a plurality of polymeric tubes 112 stranded about a central strength member 114 and a plurality of optical fibres 116 in each tube 112, and a polyethylene jacket 118 surrounding the core 100. In each cable, the central strength member 114 is tubular—the central strength member having a peripheral wall 119 enclosing a passage 120 extending along the length of the strength member 114.

A polymeric sheath 121 is disposed between the central strength member 114 and the tubes 112.

The tubular central strength member 114, which typically has an outer diameter of 3 to 8 mm and a wall thickness of 0.75 to 2.5 mm, is formed of a fibre reinforced plastics material such as a glass fibre reinforced plastics material. However, resin matrices such as carbon and aramid composites may also be used for the central strength member. The strength member 114 may be formed with aramid yarn in a stranded layer. It is also envisaged that an engineering polymer per se may be used. Further the strength member may be a thin wall metal tube.

Helically wound wrapping tape 122 surrounds the tubes 112 to retain the tubes 112 which are preferably stranded with an alternating, or so-called S–Z lay in position against the sheath 121 during manufacturing and handling of the core. Instead of the wrapping tape, a binding yarn may be used. The wrapping tape may be made from paper or plastics. Suitable materials include polyethylene, polyester, water swellable composite structures and metallic film structures. Typical yarns include polyester, polypropylene and polyethylene.

The jacket 118 is preferably formed from a high density polyethylene material and is extruded over the core 100 on which rip cords 124 are positioned. Water blocking compound 126 is provided in each tube 112 in any spaces therein which would otherwise be void. Also a water blocking material 128 is provided between the sheath 121 and the layer defined by the helically wound wrapping tape or binding yarn in any spaces between the tubes 112 which would otherwise be void.

It will be noted that a difference between the known design of cable illustrated in FIG. 1 and the cables embodying the invention illustrated in FIGS. 2 to 5 is that the central strength member 14 in FIG. 1 is solid, ie formed as a rod whereas the central strength member 114 in each of the embodiments shown in FIGS. 2 to 5 is tubular. The provision of a tubular central strength member instead of a solid central strength member reduces the weight per unit length of the cable whilst increasing its stiffness against radial deformation on application of a pushing force by a caterpillar device or the like at the inlet end of the duct into which the cable is being installed about its central axis. The decrease in weight and the increase in stiffness each increase the distance to which the cable may be blown.

Figure 2:
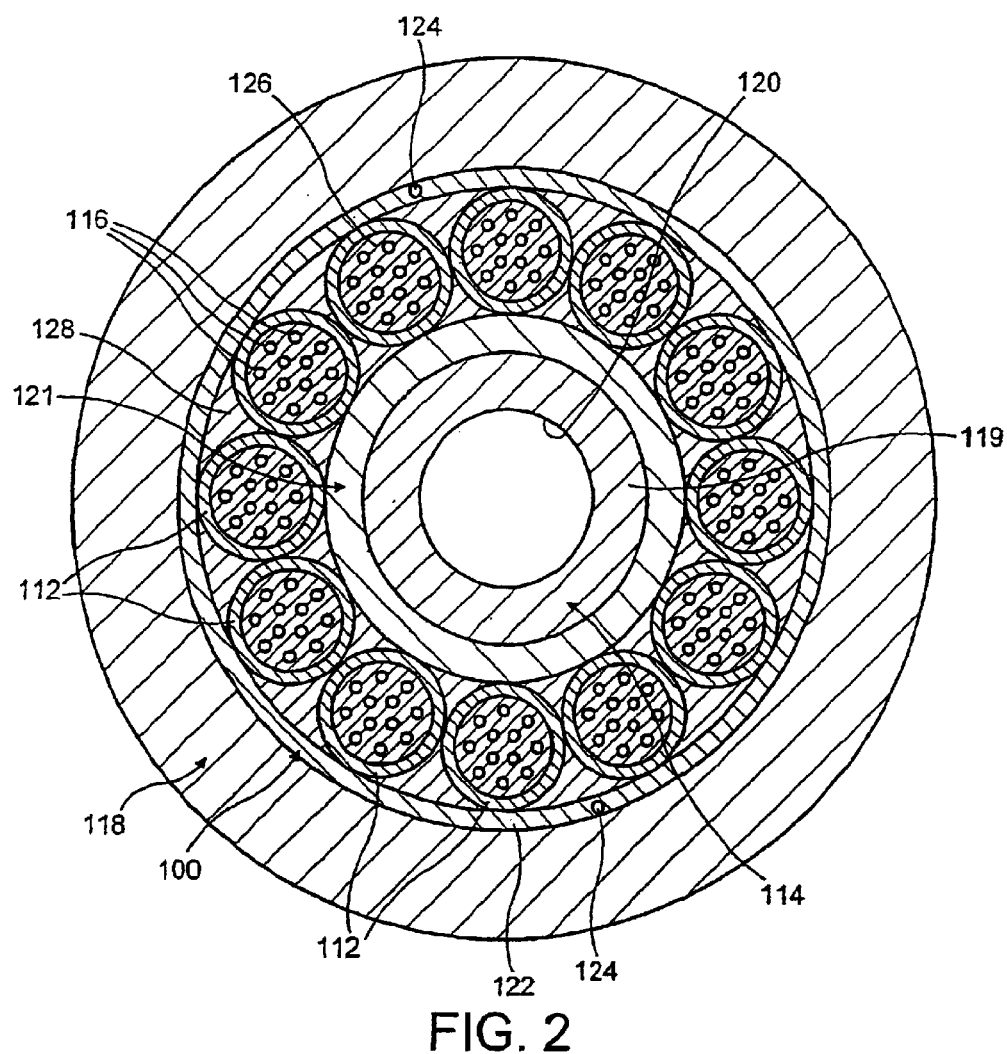
FIGS. 2 to 5 are respective radial cross-sections of four optical fibre cables for blown installation which embody the present invention.

FIG. 2 shows a cable in which the passage 120 of the tubular central strength member 114 is left void.

Figure 3:
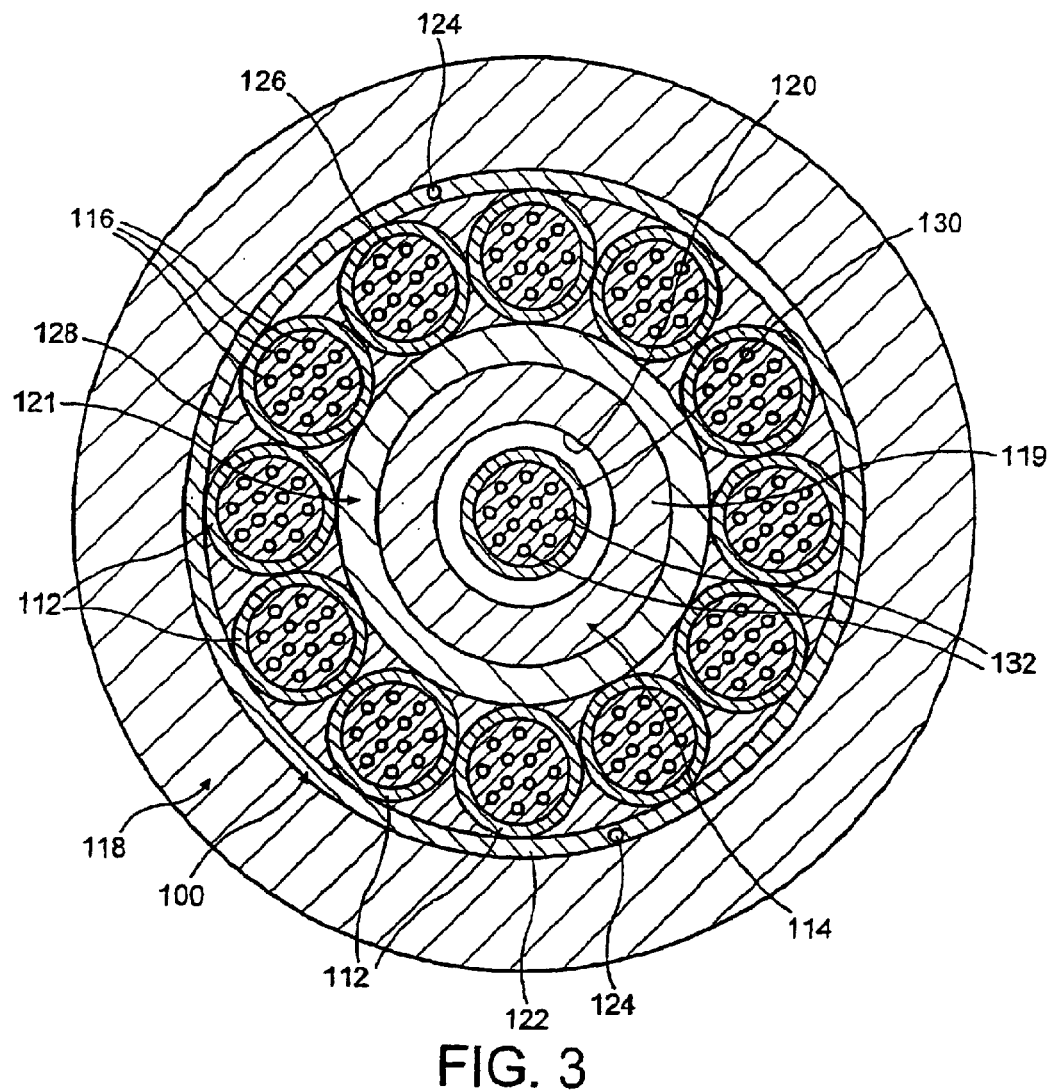

FIG. 3 shows a cable in which a tube 130 loosely housing a plurality of optical fibres 132 is accommodated within and extends along the length of the passage 120. Preferably any spaces within the tube 130 which would otherwise be void are filled with a water blocking compound As will be appreciated, the cable of FIG. 3 has a higher number of optical fibres than that of FIG. 2 with no increase in outside diameter of the cable through its utilisation of the passage 120.

Figure 4:
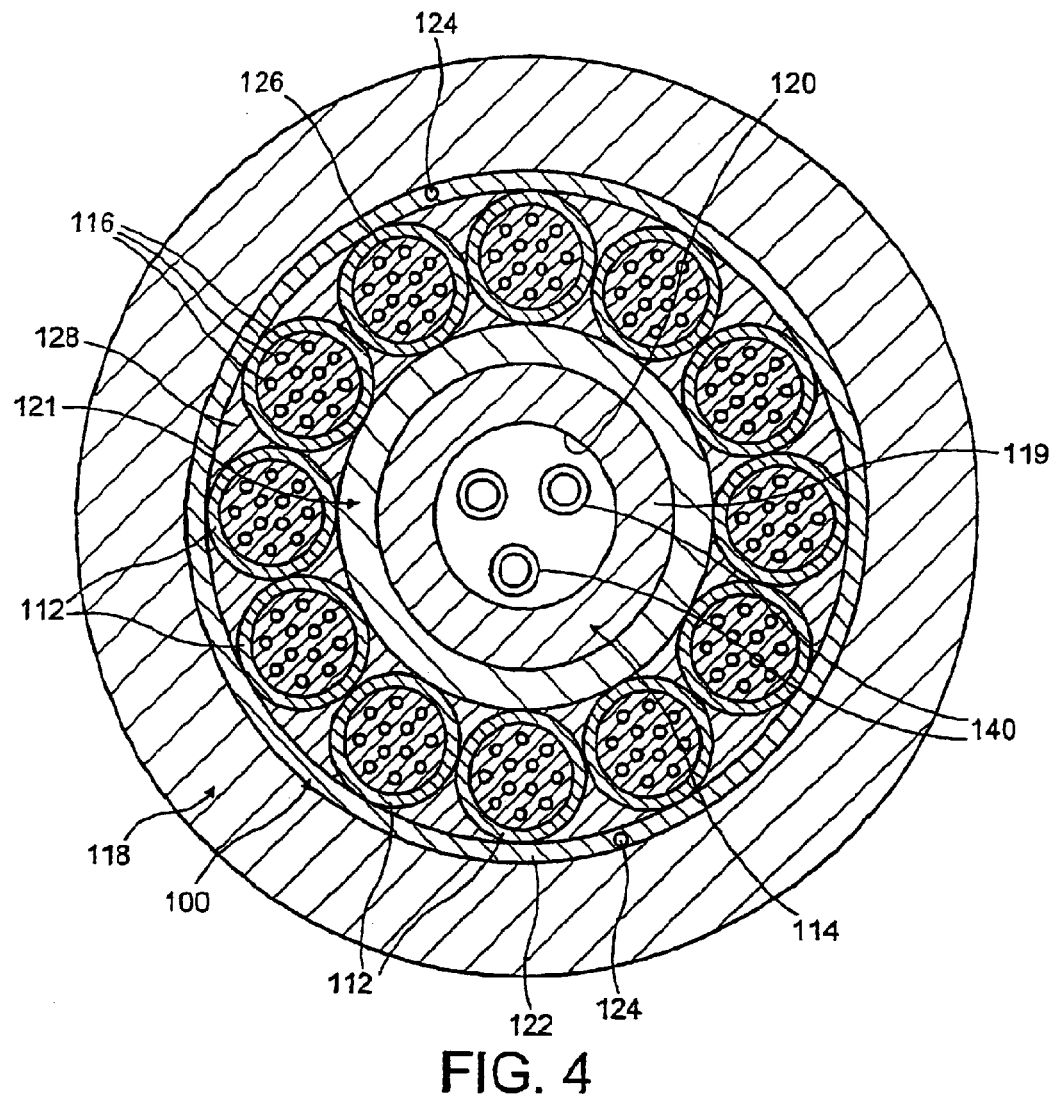

FIG. 4 shows a cable in which empty tubes 140 are accommodated within and extend along the length of the passageway. Each empty tube 140 is able to have an optical fibre blown therein to increase the number of optical fibres in the cable without increasing its outside diameter.

Figure 5:
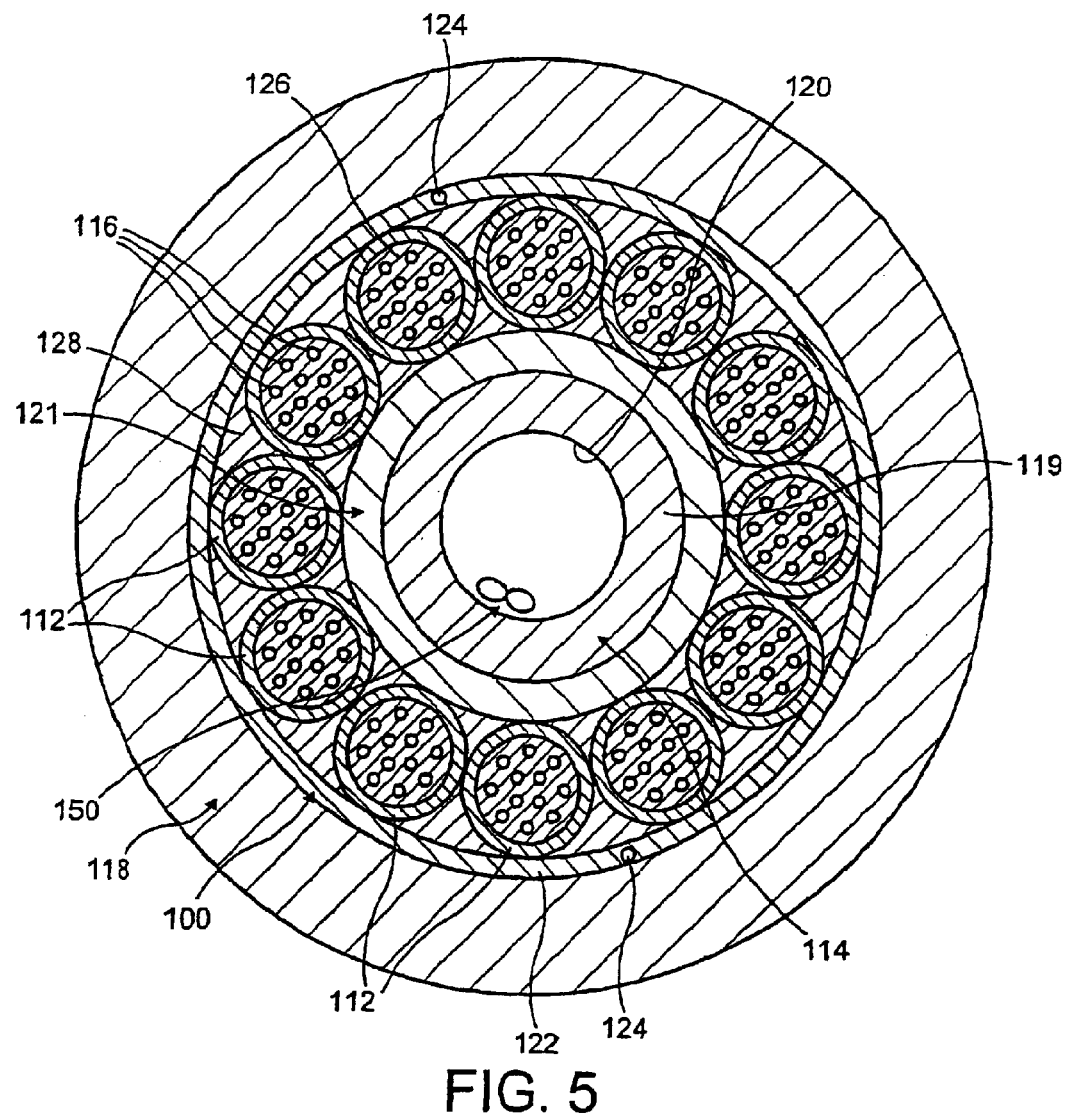

FIG. 5 shows a cable in which a detectable elongate element 150 is accommodated within and extends along the length of the passage 120. This element enables the location of the cable when it is buried or otherwise concealed to be determined. The element 150 preferably comprises an electrically conductive element such as a copper wire or twisted pair.

In the cables shown in FIGS. 2 to 5 the tubular central strength member 114 is preferably manufactured by pulltrusion with a cross head feed for the introduction into the passage 120 of the tube 130 of loosely housed optical fibres 132 in the case of FIG. 3, the empty tubes 140 in the case of FIG. 4 or the detectable elongate element 150 in the case of FIG. 5. Alternatively, the tube 130, the tube 140 or the element 150 may be blown into the passage 120 after manufacture of the tubular strength member 114.

In the cables shown in FIGS. 2 to 5, the aluminium/plastics laminate tape 20 of the cable shown in FIG. 1 has been omitted. As stated above, this tape is provided in the cable of FIG. 1 to act as a moisture barrier and to enable the location of the cable to be detected. Replacement of this tape 20 with paper or plastics tape 122 or binding yarn reduces the weight of the cable enabling the distance the cable can be blown into a duct of the same internal diameter to be increased.

Also the presence of the layer of aluminium/plastics laminate provides the cable with a shape memory which hinders unwinding of the cable from a drum during installation, the unwound cable being blown into the duct tending to take a spiral rather than straight form. Accordingly replacement of the aluminium/plastics laminate tape 20 with paper or plastics tape 122 or binding yarn improves the unwinding characteristics of the cable and thus increases the distance the cable can be blown.

However, it is to be understood that in the embodiments of FIGS. 2, 3 and 4 the aluminium/plastics laminate tape 20 may be used instead of tape 122 to enable the location of the cable to be determined Alternatively the embodiments of FIGS. 2, 3 and 4 may be modified to include an elongate element 150 within and extending along the passage 120 for cable location detection.

Whilst a plurality of tubes 112 (shown as twelve) are provided in the cables of FIGS. 2 to 5, it is to be understood that these cables may be provided with more or less tubes 112 and in an extreme case with only one such tube 112. Similarly, whilst each tube has a plurality of optical fibres (shown as twelve) loosely housed therein it is to be understood that more or less fibres and in an extreme case only one such optical fibre maybe provided within the or each tube 112.

What is claimed is:

1. An optical fibre cable having a core comprising at least one tube stranded about a central strength member and at least one optical fibre loosely housed in said at least one tube, and a jacket surrounding said core, wherein said central strength member is tubular, said central strength member having a peripheral wall enclosing a passage extending along the length of said central strength member, the passage being configured to receive a tube member by blown installation, the tube member loosely housing a plurality of optical fibres.

2. An optical fibre cable having a core comprising at least one tube stranded about a central strength member and at least one optical fibre loosely housed in said at least one tube, and a jacket surrounding said core, herein said central strength member is tubular, said central strength member having a peripheral wall enclosing a passage extending along the length of said central strength member and a tube member extending along said passage, the tube member being configured to receive an optical fibre by blown installation and to loosely house the optical fibre.

3. An optical fibre cable having a core comprising at least one tube stranded about a central strength member and at least one optical fibre loosely housed in said at least one tube, and a jacket surrounding said core, wherein said central strength member is tubular, said central strength member having a peripheral wall enclosing a passage extending along the length of said central strength member and a tube member extending along said passage and loosely housing a plurality of optical fibres.

4. An optical fibre cable having a core comprising at least one tube stranded about a central strength member and at least one optical fibre loosely housed in said at least one tube, and a jacket surrounding said core, wherein said central strength member is tubular, said central strength member having a peripheral wall enclosing a passage extending along the length of said central strength member, the passage including at least one empty tube member extending along the length of said passage of the central strength member.

5. The optical fibre cable as claimed in any one of claims 1 to 4, further comprising a sheath disposed between said central strength member and said at least one tube.

6. The optical fibre cable as claimed in any one of claim 1 to 4, wherein said central strength member is formed in a fibre reinforced plastics material.

7. The optical fibre cable as claimed in any one of claims 1 to 4, further comprising at least one elongate element enabling cable location detection accommodated within and extending along the length of said passage of the central strength member.

* * * * *

UNITED STATES PATENT AND TRADEMARK OFFICE
CERTIFICATE OF CORRECTION

PATENT NO. : 6,876,800 B2
DATED : April 5, 2005
INVENTOR(S) : Ralph Sutehall et al.

It is certified that error appears in the above-identified patent and that said Letters Patent is hereby corrected as shown below:

<u>Title page,</u>
Item [57], ABSTRACT,
Line 10, "yam" should read -- yarn --.

<u>Column 4</u>
Line 52, after "strength member", insert -- , the at least one empty tube member being configured to receive an optical fiber by blown installation --.
Line 56, "claim" should read -- claims --.

Signed and Sealed this

Thirtieth Day of August, 2005

JON W. DUDAS
*Director of the United States Patent and Trademark Office*